Patented Nov. 5, 1935

2,019,865

UNITED STATES PATENT OFFICE 2,019,865

PRODUCTION OF LACQUER BASES

Martin Luther, Mannheim, Wilhelm Pungs, Cologne, Robert Griessbach, Wolfen, and Claus Heuck, Leverkusen, Germany, assignors to Unyte Corporation, New York, N. Y., a corporation of Delaware No Drawing. Application January 3, 1933, Serial No. 650,034. In Germany November 7, 1925

7 Claims. (Cl. 260—3)

This invention relates to lacquer bases, lacquer compositions and analogous coating compositions prepared from urea-formaldehyde material, more specificially from methylol compounds of urea or thiourea and mixtures of the said bodies, incorporated, if desired, with other natural or artificial resins or other material, and to the process of preparing them.

We have found that lacquer bases, that is resinous condensation products and solutions thereof, may be prepared by condensing one or more methylol compounds of urea and/or of thiourea in organic, alcoholic solvents. After the condensation has occurred, the solutions are ready for use as lacquers. The preparation of the lacquers may be carried out as follows:—

The starting material, preferably dimethylol urea or dimethylol-thiourea, is added to an organic solvent which consists of a monohydric alcohol or contains a preponderating quantity thereof. The mixture thus obtained is condensed by applying heat thereto or by adding a small amount of an acid reacting catalyst or by applying both. In case an acid reacting catalyst is used, the heat applied should preferably not be of a very high degree. After a certain length of time, determinable as hereinafter described, the condensation is stopped by cooling down. In case an acid reacting catalyst is employed, an alkaline reacting agent is added to the solution to stop the condensation. As acid reacting catalysts acids may be used in the above condensation reaction, or such agents as would set free an acid in the course of the reaction as for example urea nitrate, ammonium chloride or ammonium phosphates, ammonium thiocyanate, ammonium sulphate or benzyl chloride. As an alkaline reacting agent to stop the condensation reaction, we prefer to use tertiary sodium phosphate or sodium bicarbonate. However, sodium hydroxide or other bases may be used with the same effect. The alcoholic solvents employed should be practically or practically completely anhydrous and should, consequently, not contain substantial quantities of water, in no case more than 10 per cent of the solvent. They may consist of alcohols or of mixtures of alcohols with other solvents, provided these latter solvents are capable of dissolving the resulting final products, or are employed in such quantities that the resulting final products are not precipitated from the solutions, as is the case with liquid aromatic hydrocarbons. Generally, alcohols containing up to 8 carbon atoms will be employed, straight chain aliphatic alcohols and primary aliphatic alcohols containing up to 6 carbon atoms, being preferred in most cases.

According to the condensation stage, the solutions of the condensation products obtained show different properties. Thus, for example, if the condensation is stopped at an early stage, lacquers are obtained coatings from which are very flexible. When stopping the condensation at a later stage, lacquers are obtained coatings from which are less flexible, but show very good adhesion to solid substrata and fastness to water. The precise time during which the condensation is to take place, of course, varies greatly, depending upon the temperature and amount of catalyst, if such be applied. It can readily be determined by experimentation which condensation conditions are most suitable, in order to obtain a product having the properties desired for a particular purpose. The course of the condensation may be observed and the extent of condensation roughly determined by taking a sample of the reaction mixture and testing it as follows:

To 5 cc. of the solution obtained, according to the above process, there are added 25 cc. of ethyl ether, whereby the condensation product is precipitated. A precipitate which consists of a slimy substance indicates an early condensation stage, while a precipitate which consists of a powder indicates a later condensation stage.

After the condensation reaction has been stopped and the reaction mixture cooled down, the solution is ready for use as a lacquer. However, in case an acid reacting catalyst has been used which has been neutralized by an alkaline reacting medium, the mixture is allowed to stand until the salt formed by the neutralization of the acid has precipitated. Thereafter, the clear solution is drawn off.

From the solution thus prepared the solvent or solvent mixture, can be driven off by heat, whereby a solid final product may be obtained. This solid final product may be dissolved again in all alcoholic solvents customarily used for lacquer purposes and the solvents or solvent mixtures employed for the condensation, for example in mixtures of alcohols with liquid hydrocarbons of the benzene series, so that the lacquer may be prepared in the usual way from these solid final products. Preferably, a small amount of the solvent employed in the condensation reaction, say about 3 to about 10 per cent by weight of the resinous condensation product is left in the solid final product. The solid final product gives the same clear solution as is directly obtainable by the condensation reaction.

These solutions are very stable and may be used for all purposes for which lacquers generally are used. Solvents, such as for instance organic esters or hydrocarbons, in which the condensation reaction cannot be carried out, because the starting materials for the condensation reaction do not dissolve therein, may be added to these lacquers. If such a solvent is added to the solution after the condensation, the condensation product is not precipitated, but a clear solution is obtained.

Monohydric alcohols for use as solvents either alone or in mixture with other solvents for the above mentioned condensation reaction are, for instance, ethyl alcohol, normal or isopropyl alcohol, normal butyl alcohol, iso-butyl alcohol, amyl alcohol, hexyl or heptyl alcohols, benzyl alcohol and ethylene-chlorhydrin. The mono-ethers or esters of ethylene glycol, for instance ethylene glycol mono-acetate and ethylene glycol mono-ethyl or mono-phenyl ethers may also be used in our process. Additional materials, such as natural or artificial resins, cellulose esters, plasticizers and the like may be added either before the condensation occurs or after the condensation has taken place. However, we prefer to add these materials after the condensation. These materials may be added in a solid form or dissolved in a suitable solvent. Care must be taken that these additions are made in such an amount that always clear solutions of the condensation product are obtained.

The methylol urea preferably used in the process is dimethylol urea, such condensation products of higher molecular weight as result from dimethylol urea by splitting off water, or mixtures of dimethylol urea or of said condensation products with mono- and/or di-methylol thiourea, mono-methylol urea should not be employed alone or in quantities exceeding 10 per cent, by weight, of dimethylolurea, dimethylol thiourea, mono-methylol thiourea or of their anhydrides, since, otherwise, turbid products may be obtained.

The methylol compounds of urea and thiourea can be obtained in the usual manner by a condensation of urea or thiourea with formaldehyde in weakly alkaline solution or neutral aqueous solutions at room temperature; see, for example, Chemiker-Zeitung 1898, page 444; the condensation products of a higher molecular weight which are apparently anhydrides can be obtained by a condensation in a more strongly alkaline solution or by splitting off water from the said methylol compounds by warming, say up to 100° C., in vacuo. For the sake of brevity the said condensation products of a higher molecular weight will be defined in the following and in the claims as anhydrides of the methylol compounds of urea and thiourea.

The use of the methylol compounds and their anhydrides has the advantage that the condensation process begins with a specific chemical compound in which the proportions of urea and formaldehyde are always the same. Furthermore, the amount of water which is produced in the course of the condensation process is not very high so that it is usually immediately taken up by the organic solvent, so that the water does not interfere at all with the condensation reaction. Therefore, lacquer solutions practically free from water are obtained according to this process, especially if a portion of the solvent is distilled off and may carry off water.

Our invention may be illustrated by the following examples although the invention is not limited thereto:

*Example 1*

To 500 grams of ethyl alcohol are added 2 grams of a 10 per cent solution of hydrochloric acid in ethyl alcohol. This solution is then boiled under reflux. Thereafter 500 grams of dimethylol urea are quickly added while stirring. After 10 minutes a clear solution is obtained. The solution is then heated for another five minutes, whereupon 10 grams of sodium bicarbonate are added to neutralize the hydrochloric acid. The mixture is cooled down to room temperature (say about 20 to 25° C.), and the resulting solution is separated from the inorganic salts by filtration.

The solution thus obtained is a very good lacquer which may be used as a binding medium in printing colours or inks for letter press or intaglio printing.

*Example 2*

1.5 grams of a 10 per cent solution of hydrochloric acid in ethyl alcohol are added to 200 grams of ethylene glycol mono-ethyl ether. The solution thus obtained is heated to about 95° C. Then, while stirring, 120 grams of a product are added which is obtained from dimethylol urea by heating for several hours in a vacuum of say 20 millimeters of mercury at a temperature of about 90 to 100° C. After from about 7 to 8 minutes a clear solution is obtained. The solution is kept for about 10 minutes at a temperature of about 95° C., after which 10 grams of tertiary sodium phosphate are added while stirring.

The solution is then cooled down to room temperature, say to from 20 to 25° C. The inorganic salts obtained by the neutralization of the acid are separated from the solution thus obtained by filtration. This solution may be used as a lacquer or for similar purposes. Suitable amounts of acetyl cellulose or of nitrocellulose may be added to the solution, whereby a mixed cellulose resin lacquer is obtained. For certain purposes it is advantageous to add to these solutions plasticizers or softening agents.

The above mentioned acetyl- and nitrocelluloses may be added before the condensation has taken place without affecting the properties of the lacquers obtained.

*Example 3*

100 grams of dimethylol urea are added to a solution of 150 grams of normal butyl alcohol and 10 cc. of a 5 per cent urea nitrate solution in ethyl alcohol, which has been previously heated to 90° C. After about 8 minutes a clear solution is obtained which is kept for another 10 minutes at a temperature of 90° C. The solution thus obtained is neutralized by adding 20 grams of tertiary sodium phosphate and then allowed to cool to room temperature, after which the inorganic salts are separated from the solution thus obtained by filtration.

The solution may be mixed with a solution of nitrocellulose and tricresyl phosphate in butyl acetate, whereby a lacquer is obtained suitable for producing films by pouring on polished metal sheets and heating to about 85° C. for some time, say for several hours, the resulting films showing a very high elasticity, adhesive power and flexibility. If amyl alcohol is used instead of normal butyl alcohol, the same results are obtained.

From the lacquer solution obtained by the condensation above described there may be obtained resinous solid condensation products by distilling off all but about 5 per cent of the solvent at about 25 millimeters (mercury) at a temperature of about 90° to 100° C. The solid product thus obtained is transparent, clear, fast to light, easily soluble in ethyl alcohol or other alcohols containing 1 or from 3 to 8 carbon atoms, or in mixtures of alcohols with esters or hydrocarbons, such as toluene.

Example 4

500 grams of benzyl alcohol are mixed with 200 grams of dimethylol urea. The mixture thus obtained is heated to a temperature of about 145° C., while stirring. After 45 minutes a solution is obtained indicating that the dimethylol urea has been condensed. The clear solution obtained is kept for a further 15 minutes at a temperature of about 145° C., and then cooled down to room temperature. This solution may be used immediately as a lacquer. If the lacquer is poured on a substratum, a film is left which resists water, if heated for several hours at a temperature of 110° C.

The condensation reaction may also be carried out by adding to the 500 grams of benzyl alcohol 10 cc. of a 5 per cent urea nitrate solution in ethyl alcohol, heating the mixture thus obtained to about 90° C. and then adding the dimethylol urea. After 10 minutes a clear solution is obtained. This solution is kept for another 5 minutes at a temperature of about 90° C. and then neutralized by the addition of 20 grams of tertiary sodium phosphate and cooled down to room temperature. The inorganic salt formed is separated from the solution by filtration. The lacquer thus obtained shows the same properties as those obtained by the first described condensation reaction.

Example 5

10 cc. of a 5 per cent urea nitrate solution in ethyl alcohol are added to 250 grams of isobutyl alcohol. The solution thus obtained is heated to about 95° C. and then 150 grams of dimethylol thiourea are added while stirring. After 10 minutes a clear solution is obtained. This solution is then heated for another 10 minutes at about 95° C. The condensation is stopped by adding 15 grams of tertiary sodium phosphate, stirring is continued for about 2 minutes, and the solution is then cooled down to room temperature. The inorganic salt is separated from the lacquer by filtration.

When pouring the resulting lacquer on a suitable substratum, films are obtained after the evaporation of the solvent, which show a very high elasticity.

If the starting material consists of 75 grams of dimethylol urea and 75 grams of dimethylol thiourea, a lacquer is obtained which produces films, after pouring the lacquer on a suitable substratum, which are somewhat hard.

To the lacquers there may be added in a similar way as in Example 3, solutions of nitrocellulose whereby mixed lacquers are obtained which may be used for similar purposes as those cited in Example 3.

Example 6

150 grams of dimethylol urea are added to a mixture of 190 grams of normal butyl alcohol and 60 grams of phenol. This mixture is heated to a temperature of from about 90° to 100° C. Then one gram of tertiary sodium phosphate, or 1.5 grams of sodium tetroxalate, is added. The mixture is kept for another 15 minutes at about 90° to 100° C., whereupon a clear solution is obtained which may immediately be used as a lacquer. When pouring the lacquer thus obtained on a suitable substratum, films are obtained which, after heating for several hours at a temperature of about 80° to 90° C., show a very great resistance to water.

Example 7

165 grams of monomethylol thiourea are introduced into a mixture of 230 grams of n-butyl alcohol and 30 cubic centimeters of a 5 per cent urea nitrate solution in ethyl alcohol, after heating the mixture to 95° C. The temperature in the reaction mixture falls to 65° C. and is raised to 100° C. after the whole thiourea has been introduced. After 4 minutes a clear solution is formed which is then kept for a further 5 minutes at 100° C. and finally neutralized with 3 cubic centimeters of a 5-n-caustic soda solution. The resulting solution may serve as a lacquer giving soft coatings or may be added to the lacquers from dimethylol urea according to the foregoing examples as a softener and/or for increasing the gloss of the coatings or films resulting therefrom.

Example 8

A mixture of 83 grams of monomethylol thiourea and 83 grams of dimethylol thiourea is introduced into a mixture of 230 grams of n-butyl alcohol and 30 cubic centimeters of a 5 per cent urea nitrate solution in ethyl alcohol, after heating the solution to 95° C. After the whole solid substance has been introduced whereby the temperature of the mixture falls to 70° C., the temperature is raised to 95° C. After 4 minutes a clear solution is formed and after 13 minutes a slight turbidity can be observed. The solution is then neutralized (pH=7) by adding an aqueous 5-n-caustic soda solution, filtered and inspissated at once in vacuo to a content of 60 per cent of dry solid substance. A highly viscous lacquer is obtained which may find useful application for the same purposes as described with reference to the product obtained according to the foregoing example.

Example 9

A mixture of 83 grams of monomethylol thiourea and 83 grams of dimethylolurea is introduced into a mixture of 230 grams of n-butyl alcohol and 30 cubic centimeters of a 5 per cent urea nitrate solution in ethyl alcohol, after heating the solution to 95° C. After the whole solid substance has been introduced whereby the temperature of the mixture falls to 70° C., the temperature is raised to 95° C. After about 12 minutes the solution is neutralized (pH=7) by adding an aqueous 5-n-caustic soda solution and filtered. A highly viscous lacquer is obtained coatings from which show a higher gloss and somewhat higher softness than those prepared from condensation products of dimethylol urea alone.

The present application is a continuation-in-part of our application Serial No. 134,251, filed September 8, 1926.

What we claim is:—

1. Process for preparing lacquers from a definite urea formaldehyde compound selected from the group consisting of dimethylol urea, dimethylol thiourea, mono-methylol thiourea and mixtures thereof by condensing the starting material in the presence of a practically anhydrous organic solvent comprising essentially a monohydric alcohol, while heating the mixture of initial material and solvent until a clear solution is formed and heating the solution at least until there is produced a resinous condensation product which can be precipitated from said solution by addition of ethyl ether.

2. Process for preparing lacquers from a definite urea formaldehyde compound selected from the group consisting of dimethylol urea, dimethylol thiourea, mono-methylol thiourea and mixtures thereof by condensing the starting material in the presence of a practically anhydrous organic solvent comprising essentially a monohydric alcohol and in the presence of an acid reacting catalyst, while heating the mixture of initial material and solvent until a clear solution is formed and heating the solution at least until there is produced a resinous condensation product which can be precipitated from said solution by addition of ethyl ether.

3. Process for preparing lacquers from a definite urea formaldehyde compound selected from the group consisting of dimethylol urea, dimethylol thiourea, mono-methylol thiourea and mixtures thereof by condensing the starting material in the presence of a practically anhydrous monohydric alcohol while heating the mixture of initial material and solvent until a clear solution is formed and heating the solution at least until there is produced a resinous condensation product which can be precipitated from said solution by addition of ethyl ether.

4. Process for preparing condensation products from dimethylolurea by condensing the starting material in the presence of a practically anhydrous aliphatic monohydric alcohol containing up to 8 carbon atoms and in the presence of a small amount of an acid reacting catalyst while heating the mixture of initial material and solvent until a clear solution is formed and heating the solution at least until there is produced a resinous condensation product which can be precipitated from said solution by addition of ethyl ether.

5. Process for preparing condensation products from dimethylolurea by condensing the starting material in the presence of practically anhydrous ethylene glycol monoacetate and a small amount of an acid reacting catalyst while heating the mixture of initial material and solvent until a clear solution is formed and heating the solution at least until there is produced a resinous condensation product which can be precipitated from said solution by addition of ethyl ether.

6. Process for preparing condensation products from dimethylolurea by condensing the starting material in the presence of practically anhydrous isobutyl alcohol and a small amount of an acid reacting catalyst while heating the mixture of initial material and solvent until a clear solution is formed and heating the solution at least until there is produced a resinous condensation product which can be precipitated from said solution by addition of ethyl ether.

7. A solid lacquer base, fast to light, capable of producing flexible lacquer coatings having a high resistance to water, soluble in alcohols containing up to 8 carbon atoms and in mixtures of said alcohols with organic esters or aromatic hydrocarbons and compatible with cellulose esters obtainable by condensing a definite urea-formaldehyde compound selected from the group consisting of di-methylol urea, di-methylol thiourea, mono-methylol thiourea and mixtures thereof in the presence of a practically anhydrous monohydric alcohol while heating the mixture of initial material and solvent until a clear solution is formed and heating the solution at least until there is produced a resinous condensation product which can be precipitated from said solution by addition of ethyl ether and removing all but a small amount of said solvent.

MARTIN LUTHER.
WILHELM PUNGS.
ROBERT GRIESSBACH.
CLAUS HEUCK.